US011835133B2

(12) United States Patent
Moine et al.

(10) Patent No.: US 11,835,133 B2
(45) Date of Patent: Dec. 5, 2023

(54) VARIABLE SPACING FLANGE PULLEY FOR VARIABLE-SPEED DRIVE

(71) Applicant: VITESCO TECHNOLOGIES GmbH, Hannover (DE)

(72) Inventors: Xavier Moine, Toulouse (FR); Guillaume Lhermite, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 333 days.

(21) Appl. No.: 17/264,996

(22) PCT Filed: Jul. 18, 2019

(86) PCT No.: PCT/EP2019/069396
§ 371 (c)(1),
(2) Date: Feb. 1, 2021

(87) PCT Pub. No.: WO2020/025343
PCT Pub. Date: Feb. 6, 2020

(65) Prior Publication Data
US 2021/0324946 A1    Oct. 21, 2021

(30) Foreign Application Priority Data
Aug. 1, 2018 (FR) ..................................... 1857212

(51) Int. Cl.
*F16H 9/12* (2006.01)
*F16H 9/14* (2006.01)
*F16H 9/18* (2006.01)

(52) U.S. Cl.
CPC ............... *F16H 9/125* (2013.01); *F16H 9/14* (2013.01); *F16H 9/18* (2013.01)

(58) Field of Classification Search
CPC ...... F16H 55/56; F16H 63/067; F16H 55/563; F16H 61/66272; F16H 9/18
(Continued)

(56) References Cited

U.S. PATENT DOCUMENTS 3,830,112 A * 8/1974 Ward .................... F16H 55/563
474/38
4,722,718 A * 2/1988 Eugen ................... F16H 37/022
474/19
(Continued)

FOREIGN PATENT DOCUMENTS

CN   1415870 A   5/2003
CN   1678844 A   10/2005
(Continued)

OTHER PUBLICATIONS

Office Action issued in Chinese Patent Application No. 201980050942.1 dated Sep. 26, 2021.
(Continued)

*Primary Examiner* — Henry Y Liu
(74) *Attorney, Agent, or Firm* — NIXON & VANDERHYE

(57) ABSTRACT

Disclosed is a pulley having: a shaft; a first shroud, called the fixed shroud, mounted so as to be unable to move in translation with respect to the shaft; a second shroud, called the movable shroud, mounted to be driven in rotation by the shaft but is able to move longitudinally with respect to the latter; a mechanism for mechanically controlling the longitudinal movement of the second shroud with respect to the shaft, having: —a first assembly, which is mounted on the shaft and driven in rotation by the latter, —a second assembly, which is mounted on the shaft by way of at least one torsion spring such that the relative angular position of the second assembly with respect to the shaft depends on the torque transmitted by the shaft, and —a device for locking in at least one position between the first assembly and the second assembly.

19 Claims, 7 Drawing Sheets

(58) Field of Classification Search
USPC .................................................. 474/13, 15
See application file for complete search history.

(56) References Cited

U.S. PATENT DOCUMENTS

| | | | | |
|---|---|---|---|---|
| 5,045,028 | A * | 9/1991 | Rattunde | F16H 61/66259 474/19 |
| 5,052,981 | A * | 10/1991 | Robert | F16H 61/66245 474/14 |
| 5,108,347 | A * | 4/1992 | Gourdon | F16H 55/563 474/13 |
| 5,188,568 | A * | 2/1993 | Gourdon | F16H 55/563 474/43 |
| 5,328,413 | A * | 7/1994 | Robert | F16H 55/563 474/13 |
| 5,458,539 | A * | 10/1995 | Landry | F16H 55/563 474/46 |
| 5,692,983 | A * | 12/1997 | Bostelmann | F16H 55/563 474/14 |
| 6,336,878 | B1 * | 1/2002 | Ehrlich | F16H 63/065 474/18 |
| 6,346,056 | B1 * | 2/2002 | Nouis | F16H 61/66272 474/14 |
| 6,520,878 | B1 * | 2/2003 | Leclair | F16H 55/563 474/14 |
| 6,733,406 | B2 * | 5/2004 | Kitai | F16H 55/56 474/14 |
| 6,786,844 | B2 * | 9/2004 | Fritzer | F16H 59/16 475/213 |
| 7,313,977 | B2 * | 1/2008 | Borghi | F16H 61/66245 74/13 |
| 7,803,074 | B2 * | 9/2010 | Ishida | F16H 55/563 474/8 |
| 7,871,353 | B2 * | 1/2011 | Nichols | F16H 57/0487 74/56 |
| 7,959,533 | B2 | 6/2011 | Nichols et al. | |
| 8,105,190 | B2 * | 1/2012 | Galletti | F16H 63/067 192/105 CD |
| 8,262,536 | B2 | 9/2012 | Nichols et al. | |
| 8,317,650 | B2 | 11/2012 | Nichols et al. | |
| 9,057,432 | B1 * | 6/2015 | Bouffard | F16H 55/56 |
| 9,121,464 | B2 | 9/2015 | Nichols et al. | |
| 10,208,840 | B2 | 2/2019 | Nichols et al. | |
| 2001/0039222 | A1 * | 11/2001 | Mukai | F16H 55/563 474/11 |
| 2002/0068660 | A1 * | 6/2002 | Fritzer | F16D 41/066 477/37 |
| 2002/0183145 | A1 * | 12/2002 | Blanchard | F16H 9/18 474/19 |
| 2004/0082415 | A1 * | 4/2004 | Borghi | F16H 55/563 474/14 |
| 2004/0142781 | A1 * | 7/2004 | Huddleston | F16H 55/56 474/19 |
| 2004/0171443 | A1 * | 9/2004 | Borghi | F16H 63/067 474/12 |
| 2005/0064968 | A1 * | 3/2005 | Robert | F16H 63/067 474/12 |
| 2005/0090341 | A1 * | 4/2005 | Lohr | F16H 55/563 474/13 |
| 2005/0096163 | A1 * | 5/2005 | Gu | F16H 9/16 474/10 |
| 2005/0181899 | A1 * | 8/2005 | Plath | F16H 61/66272 474/18 |
| 2007/0202975 | A1 * | 8/2007 | Ishida | F16H 55/563 474/8 |
| 2009/0054181 | A1 * | 2/2009 | Nogi | F16F 15/32 474/8 |
| 2012/0172162 | A1 * | 7/2012 | Tseng | F16H 9/18 474/15 |
| 2013/0157793 | A1 * | 6/2013 | Dec | F16H 63/067 474/8 |
| 2014/0315670 | A1 * | 10/2014 | Mariotti | F16H 9/12 474/12 |
| 2014/0349792 | A1 * | 11/2014 | Aitcin | F16H 55/563 474/13 |
| 2015/0111674 | A1 * | 4/2015 | Yuan | F16H 63/067 474/14 |
| 2015/0122557 | A1 * | 5/2015 | Fairhead | B62D 11/105 180/6.7 |
| 2015/0323065 | A1 * | 11/2015 | Pattakos | F16H 61/66272 474/11 |
| 2017/0023120 | A1 * | 1/2017 | Zulawski | F16H 55/56 |
| 2017/0138450 | A1 * | 5/2017 | Hart | F16H 37/022 |
| 2018/0370595 | A1 * | 12/2018 | Faneco | F16H 61/66245 |
| 2020/0018384 | A1 | 1/2020 | Nichols et al. | |

FOREIGN PATENT DOCUMENTS

| | | |
|---|---|---|
| CN | 101278146 A | 10/2008 |
| CN | 101454596 A | 6/2009 |
| CN | 201284819 Y | 8/2009 |
| CN | 103998824 A | 8/2014 |
| CN | 203948589 U | 11/2014 |
| CN | 104755814 A | 7/2015 |
| EP | 1 564 441 B1 | 4/2018 |
| FR | 2 502 275 A1 | 9/1982 |
| JP | 2016188661 A | 11/2016 |
| JP | 2017031993 A | 2/2017 |
| JP | 2017032086 A | 2/2017 |
| TW | 201704086 A | 2/2017 |
| TW | 201706524 A | 2/2017 |
| TW | I570339 | 2/2017 |
| WO | 2017072743 A1 | 5/2017 |
| WO | 2017086305 A1 | 5/2017 |
| WO | 2017101936 A1 | 6/2017 |

OTHER PUBLICATIONS

International Search Report for PCT/EP2019/069396 dated Sep. 30, 2019, 4 pages.
Written Opinion of the ISA for PCT/EP2019/069396 dated Sep. 30, 2019, 5 pages.

* cited by examiner

VARIABLE SPACING FLANGE PULLEY FOR VARIABLE-SPEED DRIVE

CROSS-REFERENCE TO RELATED APPLICATIONS

This application is the U.S. national phase of International Application No. PCT/EP2019/069396 filed Jul. 18, 2019 which designated the U.S. and claims priority to FR Patent Application No. 1857212 filed Aug. 1, 2018, the entire contents of each of which are hereby incorporated by reference.

BACKGROUND OF THE INVENTION

Field of the Invention

The present invention relates to a variable-spacing shroud pulley for a speed variator.

Description of the Related Art

The field of the present invention is that of continuously variable transmission (or CVT) systems. Such a system is placed between a driving shaft and a driven shaft and makes it possible to continuously modify the (rotational) speed ratio between the driven shaft and the driving shaft.

In order to continuously vary the speed ratio (within a predetermined range), a belt is used that is mounted between a driving pulley and a driven pulley. Each pulley has two shrouds and, for at least one of the pulleys, the spacing between the two shrouds is variable. Usually, both pulleys exhibit variable spacing of their shrouds.

The spacing between the shrouds of a pulley usually varies either depending on the load (torque) to be transmitted or depending on the rotational speed. It is possible for example to have a transmission with one pulley having a shroud spacing that is variable depending on the rotational speed and the other pulley having a shroud spacing that is variable depending on the torque transmitted.

Such transmission systems are found in particular on two-wheeled motor vehicles (scooters and other mopeds) and on certain vehicles such as snowmobiles for example (without limitation).

With purely mechanical transmission systems, it is possible to vary the way in which the ratio between the driving shaft and the driven shaft is varied by altering masses and/or stiffnesses of springs and/or dimensions of components (in order to vary a torque, for example). In this way, the behavior of the vehicle can be modified. It is for example possible to have a vehicle that reacts promptly during acceleration or for example to prioritize low fuel consumption for the vehicle. A compromise, usually between performance and fuel consumption, then has to be found.

In order to optimize the operation of a vehicle provided with a transmission with a continuously variable transmission system, it is thus proposed that the spacing between the shrouds of at least one pulley be controlled.

Thus, it is for example known on a scooter to vary the spacing of the shrouds of the driven pulley depending on the output speed of the transmission with the aid of a flyweight system, while the spacing of the shrouds of the driving pulley is managed by a motorized system. For the driving pulley, an electric motor managed by control electronics moves one shroud of the pulley (by way of a geared and/or worm transmission), with the other shroud remaining longitudinally fixed with respect to the drive shaft.

Such a system allows electronic management of the transmission ratio under all operating conditions. The electronics can be programmed to provide, upon request, either a high-performance vehicle or a vehicle with optimized fuel consumption.

However, this solution has the drawback of having both a high cost price and a relatively large space requirement, since the electric motor used has to be a relatively powerful motor.

SUMMARY OF THE INVENTION

It is therefore an aim of the present invention to provide an essentially mechanical solution that allows at least two different modes of managing the transmission ratio.

Advantageously, it will be possible to change from one management mode to another at the request of the user.

To this end, the present invention proposes a pulley having:
  a shaft,
  a first shroud, called the fixed shroud, which is mounted so as to be unable to move longitudinally with respect to the shaft,
  a second shroud, called the movable shroud, which is mounted so as to be driven in rotation by the shaft but is able to move longitudinally with respect to the latter,
  a mechanism for mechanically controlling the longitudinal movement of the second shroud with respect to the shaft, having:
    a first assembly, which is mounted on the shaft and driven in rotation by the latter,
    a second assembly, which is mounted on the shaft by way of at least one torsion spring such that the relative angular position of the second assembly with respect to the shaft depends on the torque transmitted by the shaft.

According to the present invention, means for locking in at least one position are provided between the first assembly and the second assembly.

It is thus possible to keep the pulley in a certain position. Thus, the mode of operation of the pulley in a transmission system can be modified: there is the "normal" mode of operation, in which the locking is inactive and in which the first assembly and the second assembly rotate relative to one another depending on the load on the pulley, and an "adapted" mode of operation when the locking system immobilizes the relative position of the first assembly with respect to the second assembly.

In such a pulley, the locking means have for example, for the one part, a radially extending finger and, for the other part, a hole made in a peripheral wall, the finger being able to move between a position in which it is located entirely inside the peripheral wall and a position in which it projects into the hole made in the peripheral wall. Since the finger extends radially, it is subjected to centrifugal force and comes out of its recess if its rotational speed is high enough. In this embodiment, provision may be made for the pulley to also have unlocking means with a controlled peg (for example controlled with the aid of an electromagnet or some other two-position actuator) for pushing the finger back into the peripheral wall.

If the locking means have a locking finger, the latter can also extend (and move) longitudinally with respect to the shaft. The finger can then for example lock two substantially transverse walls together. Such a finger can also be associated with an unlocking mechanism.

In such a pulley, when the relative rotational movement of the second assembly with respect to the shaft is within a predetermined angular range, the first assembly and the second assembly are preferably locked together when the second assembly is substantially in a position corresponding to one end of said angular range. Preferably, this end will correspond to a maximum load transmitted by the pulley. Mechanical stops usually define the angular range in which the second assembly can move with respect to the first assembly.

According to a preferred variant embodiment, the pulley may also have at least two movable catches that are articulated about an axis disposed in a plane transverse to the shaft and of which the angular position about the axis thereof is given by the angular position of the second assembly with respect to the shaft, and a flyweight is guided in each case so as to be in contact, on one side, with a movable catch and, on the other side, with the face of the movable shroud that faces away from the fixed shroud.

In a pulley according to the present invention, the first assembly may for example have:
- a first cylindrical part that is mounted on the shaft and has on its outer face, facing away from the shaft, at least one helical groove,
- an end wall, and
- an outer peripheral wall,
  the second assembly for its part then being able to have:
- a plate, said plate being arranged such that the end wall, the peripheral wall and the plate form a housing for accommodating the at least one torsion spring,
  and said pulley also having an intermediate assembly with:
- a second cylindrical part that is mounted at least partially around the first cylindrical part and has a peg engaged in the helical groove, said second cylindrical part being mounted so as to slide in translation parallel to the shaft.

In this embodiment, which also has movable catches as mentioned above, provision may be made for each movable catch to have a hinge pin for articulation with respect to the plate and to be guided radially in translation with respect to the second cylindrical part.

According to another embodiment, the first assembly may have:
- a first cylindrical part mounted on the shaft and
- a plate mounted on the cylindrical part,
  and the second assembly may have:
- a peripheral wall connected directly or indirectly to the shaft by the at least one torsion spring, said peripheral wall covering the plate of the first assembly.

In this other embodiment, which also has movable catches as mentioned above, provision may be made for each movable catch to have, for the one part, a hinge pin for articulation with respect to the plate and, for the other part, an arm extending into a helical groove made in the peripheral wall of the second assembly.

The present invention also relates to a belt speed variator having two pulleys mounted on parallel shafts, characterized in that one of the pulleys is a pulley as described above.

DESCRIPTION OF THE PREFERRED EMBODIMENTS

Figure 1:
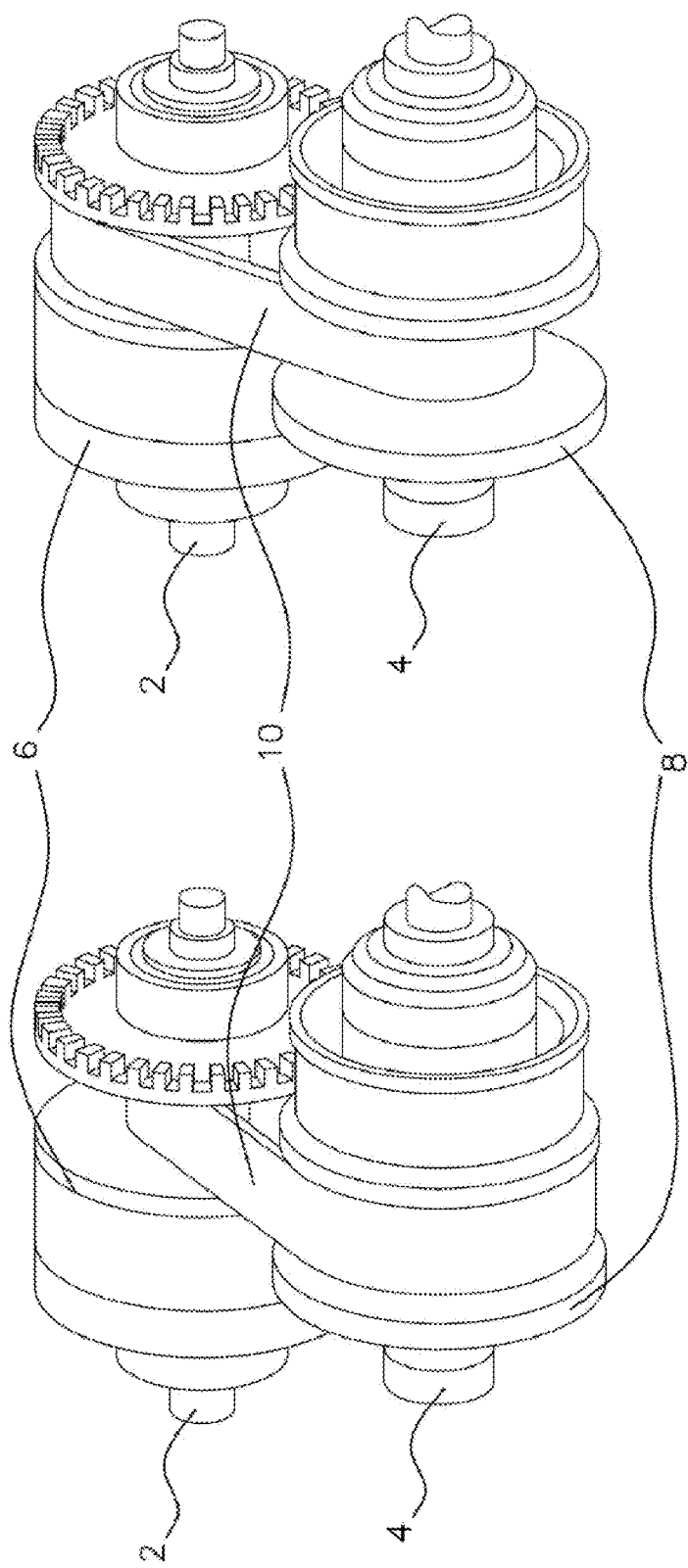
FIG. 1A is a schematic view of a continuously variable transmission with a belt, in a first transmission ratio, FIG. 1B corresponds to FIG. 1A for another transmission ratio.

FIGS. 1A and 1B each show a continuously variable transmission (or CVT) system. Such a system is placed between a driving shaft 2 and a driven shaft 4 and makes it possible to continuously modify the (rotational) speed ratio between the driven shaft 4 and the driving shaft 2. The driving shaft 2 bears a driving pulley 6, while the driven shaft 4 bears a driven pulley 8. The two pulleys are connected to one another by a belt 10.

Each pulley has two conical shrouds and, for at least one of the pulleys, the spacing between the two shrouds is variable. In the embodiment illustrated here, both pulleys exhibit variable spacing of their shrouds. In order to continuously vary the speed ratio (within a predetermined range), the spacing of the shrouds of the driving pulley and/or of the driven pulley is modified continuously such that the radius of curvature of the belt 10 changes.

FIG. 1A illustrates a small transmission ratio: the driven shaft 4 rotates less quickly than the driving shaft 2. By contrast, in FIG. 1B the driven shaft 4 rotates more quickly than the driving shaft 2.

FIGS. 2 to 6 illustrate an embodiment of a driving pulley intended for a continuously variable transmission of the type illustrated in FIG. 1.

Figure 2:
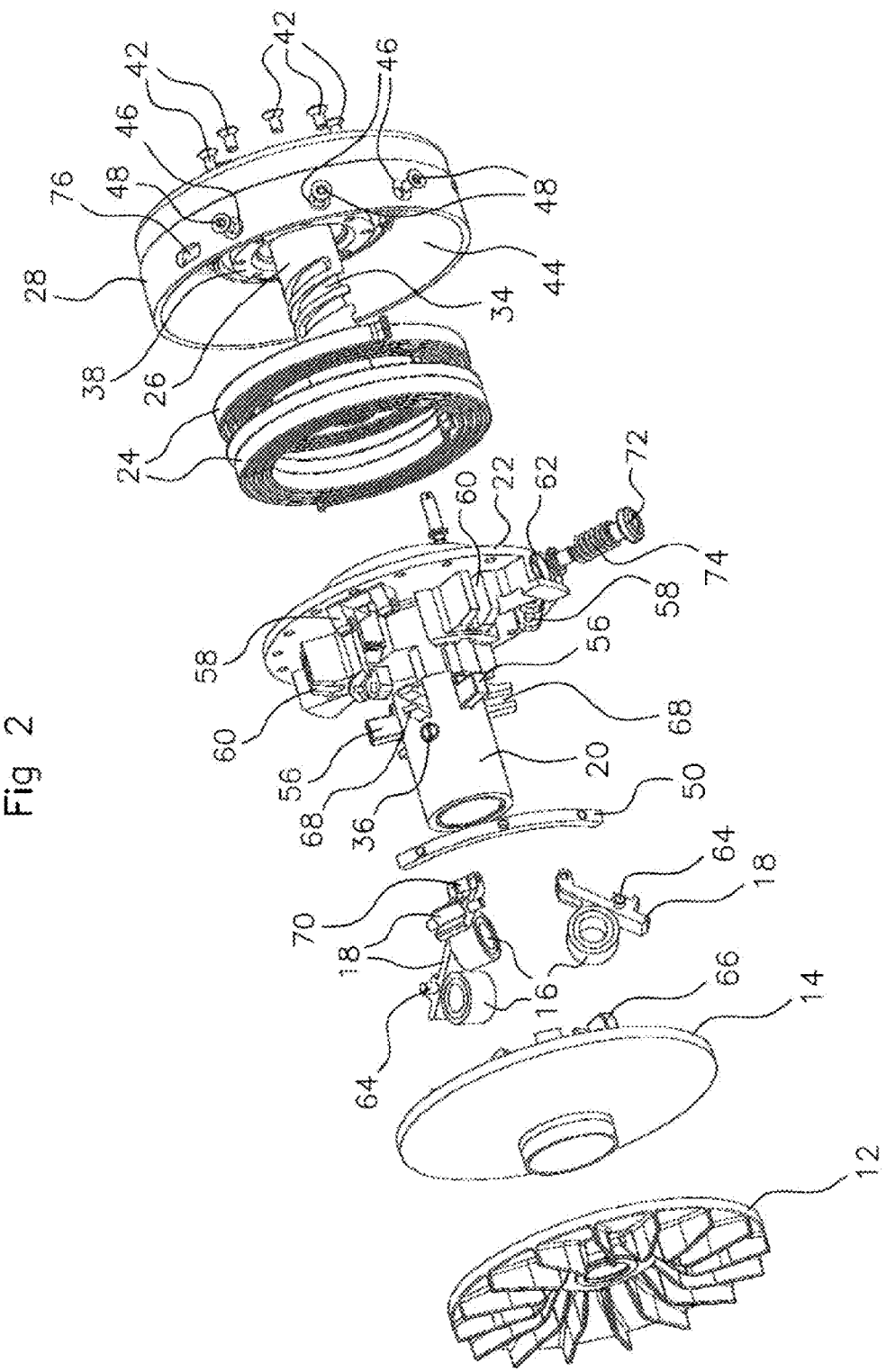
FIG. 2 is an exploded view of a pulley intended for a transmission of the type illustrated in FIG. 1.

The pulley illustrated in FIG. 2 has in particular (non-exhaustive list) an outer shroud 12, an inner shroud 14, flyweights 16 cooperating with catches 18 and the inner shroud 14, a central ring 20, a plate 22, springs 24, a bushing 26 and a casing 28.

The outer shroud 12 is a conical shroud. Its outer face, visible in FIG. 2, has fins that are optional and that depend on the environment in which said shroud is placed. These fins make it possible to ensure ventilation in the space in which the transmission to which this pulley belongs is placed. The inner face of the outer shroud 12 is substantially symmetric to the inner face, visible in FIG. 2, of the inner shroud 14. For each of the two shrouds, i.e. the outer shroud 12 and the inner shroud 14, there is in each case a central part that is conventionally used both for direct or indirect mounting on the driving shaft (not illustrated in FIGS. 2-6) and for determining the minimum space between the outer shroud 12 and the inner shroud 14 (and optionally also the maximum space).

Figure 3:
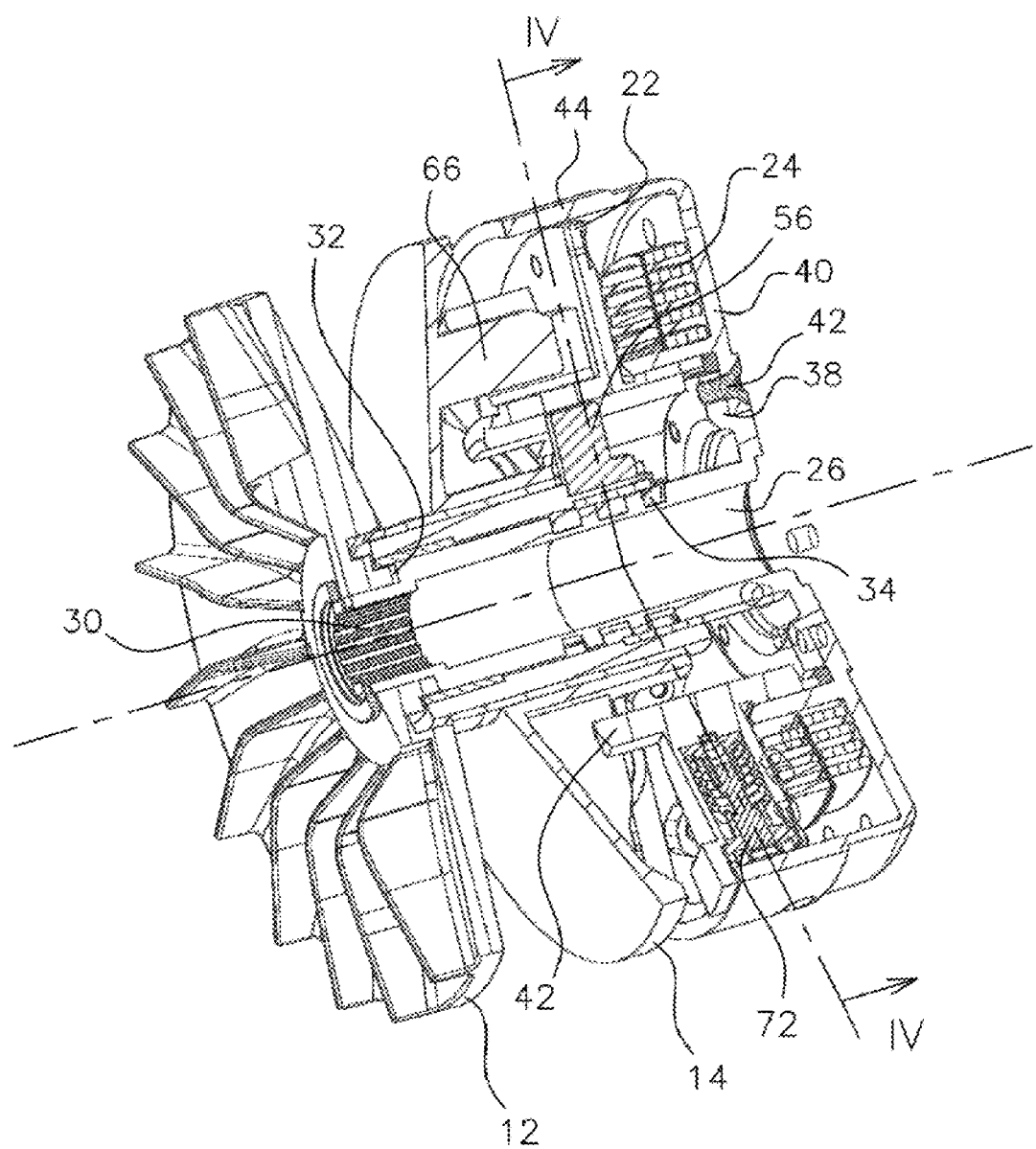
FIG. 3 is a perspective cross-sectional view of the pulley in FIG. 2 in an assembled state.

As can be seen in FIG. 3 in particular, the outer shroud 12 is mounted on a free end of the bushing 26, while the inner shroud 14 is mounted on the central ring 20. The outer shroud 12 is unable to move longitudinally with respect to the shaft on which it is mounted (and is free to rotate with respect to the latter), while the inner shroud 14 can move longitudinally and exhibit, as will become apparent below, a helical movement with respect to the shaft.

The bushing 26 has a cylindrical part intended to accommodate the driving shaft 2. The inner face of this bushing 26 has, at one end, splines 30 (FIGS. 3 and 6 in particular) to allow it to be driven by the driving shaft 2, which has corresponding splines (not illustrated in the drawing).

The outer face of the bushing 26 has, at its end provided with splines 30, a shoulder 32 that is used to position the outer shroud 12 on the bushing 26. The outer face of the bushing 26 also has a helical groove 34. The latter cooperates with a peg 36 screwed into the central ring 20 so as to guide the movement of the central ring 20 with respect to the bushing 26. The peg 36 is screwed radially from the outside through the central ring 20 such that its end passes into the helical groove 34. The ends of the latter define mechanical stops that limit the relative movement between the central ring 20 and the bushing 26.

The bushing 26 also has, on the opposite side from the end bearing the outer shroud 12, a fastening flange 38 for the casing 28.

The casing 28 has an end wall 40 with an annular shape that is fastened to the periphery of the fastening flange 38 with the aid of screws 42. The casing 28 also has a peripheral wall 44 with a circular cylindrical overall shape, which is centered on the bushing 26 when the casing 28 is fastened to said bushing 26. This peripheral wall 44 extends from the outer edge of the end wall 40, like a skirt, in the direction of the shrouds (inner shroud 14 and outer shroud 12). It has three bores 46 for the fastening, by screws 48, of a spacer 50.

The springs 24 are housed in the casing 28. They are torsion springs that are mounted between the assembly formed by the bushing 26 and the casing 28 (these two elements form an assembly secured by way of the screws 42), on one side, and the plate 22 on the other side. The springs 24 are thus housed in a space delimited by the casing 28, the bushing 26 and the plate 22. The spacer 50 keeps the plate 22 in its longitudinal position along the driving shaft (or along the bushing 26 which is driven in rotation by the driving shaft and does not move longitudinally with respect to the latter).

The plate 22, however, is able to rotate with respect to the bushing 26. Specifically, depending on the stiffness of the springs 24 and the torque transmitted by the driving shaft, the angular position of the plate 22 varies with respect to the casing 28 (or bushing 26, this being equivalent).

The plate 22 extends radially with respect to the driving shaft. On the side of the casing 28, it has elements for centering and attaching the spring 24, which rests against it.

At its center, the plate 22 has a circular cylindrical hub 52 centered on the bushing 26. This hub 52 has, on the inside, longitudinal grooves 54 accommodating ribs 56 that extend radially from the central ring 20. Thus, the central ring 20 and the plate 22 move with respect to one another with a longitudinal translational movement, while the plate 22 rotates about the bushing 26 (pure rotation) and the central ring 20 moves helically with respect to the bushing 26.

On the side of the inner shroud 14, the plate 22 also has pivot bearings 58, guide slots 60 and a radial recess 62.

The pivot bearings 58, which in this case are three in number, are intended to accommodate a pivot pin 64 of a catch 18. They are oriented tangentially. The pivot pins of each catch are thus in a transverse plane with respect to the shaft of the pulley.

The guide slots 60 for their part each receive a guide finger 66 made in the face of the inner shroud 14 that faces the plate 22.

In addition to the elements that have already been described, the central ring 20 also has on its outer face guide forks 68. Each fork has two teeth that each extend radially and are aligned longitudinally with respect to one another. These guide forks 68 (of which there are three in the exemplary embodiment illustrated here) each accommodate a bearing 70 made at one end of a catch 18.

The radial recess 62 accommodates a locking finger 72 that is preloaded toward the inside of the radial recess 62 by a return spring 74. This locking finger 72 is intended to face the peripheral wall 44 of the casing 28. It is able to move between a position in which it is withdrawn completely into its radial recess 62, or at the very least sufficiently withdrawn so as not to come into contact with the peripheral wall 44, and a moved-out position in which it projects into an oblong hole 76 extending transversely in the peripheral wall 44. The length of the oblong hole 76 corresponds for example to between two and three times the diameter of the locking finger 72.

The assembled pulley is clearly visible in particular in FIGS. 3 and 6. The bushing 26 is mounted on the driving shaft so as to be secured thereto. It is made to rotate as one therewith by the splines 30 and is prevented from moving in translation by the mounting of the outer shroud 12, which is mounted so as to be unable to move in translation against the shoulder 32 with the aid of a nut 78 (or similar: cf. FIG. 6).

As explained above, the bushing 26 and the casing 28 are mounted such that they are secured to one another. The plate 22, by way of the springs 24, adopts an angular position with respect to the bushing 26 (and therefore to the driving shaft) that depends on the torque transmitted by the driving shaft. This plate 22 does not move longitudinally.

When the plate 22 changes angular position, it drives the central ring 20 in rotation with it (presence of ribs 56 cooperating with the longitudinal grooves 54). Because of the connection between the central ring 20 and the peg 36, the central ring 20 then moves in translation with respect to the plate 22.

The catches 18 are mounted in a pivotable manner on the pivot bearings 58 of the plate 22 and are guided by the guide forks 68 of the central ring 20. Thus, when the torque applied to the shaft varies, the plate 22 changes angular position with respect to the bushing 26 and the central ring 20 exhibits a relative longitudinal translational movement with respect to the plate 22. This translational movement carries along an end of each of the catches 18, said end being able to move radially. Furthermore, since these catches 18 are mounted so as to pivot with respect to the plate 22, they change inclination with respect to a radial axis. Therefore, like the angular position of the plate 22 with respect to the bushing 26 and like the longitudinal position of the central ring 20, the inclination of the catches 18 changes depending on the load on the shaft (or depending on the torque transmitted).

The flyweights 16 are each guided between the inner shroud 14 and the plate 22 in a known manner so as to be able to move radially between, for the one part, a substantially conical face of the inner shroud 14 and a catch 18, which in this case forms a ramp along which the corresponding flyweight 16 moves.

The flyweights 16, which are subjected to centrifugal force when the driving shaft rotates, will thus move away from the driving shaft when the rotational speed increases, thus tending to move the inner shroud 14 closer to the outer shroud 12. Depending on the load on the driving shaft, this movement will be influenced by the inclination of the catches 18.

Figure 6A:
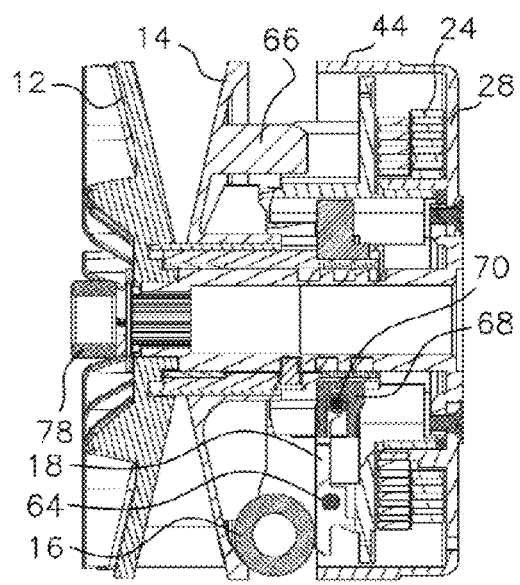
Figure 6B:
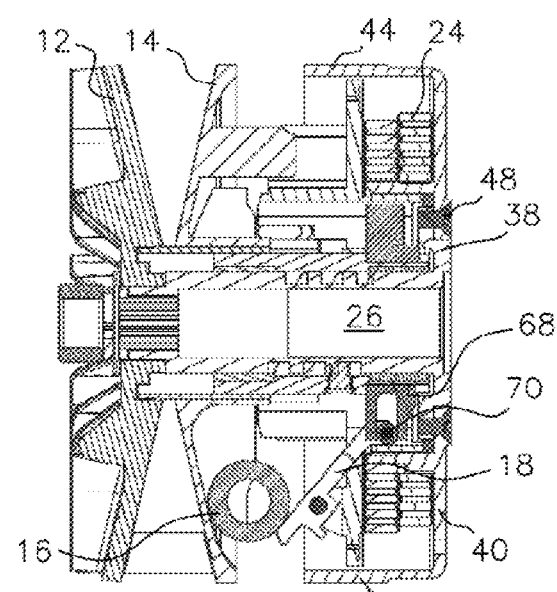

FIGS. 6A to 6D illustrate four positions of the inner shroud 14. FIGS. 6A and 6B correspond to a high speed of the vehicle (the speed of the vehicle is proportional to the rotational speed of the driven shaft and influences, by way of the belt, the behavior at the driving shaft), while FIGS. 6C and 6D correspond to a moderate motor speed.

Figure 6C:
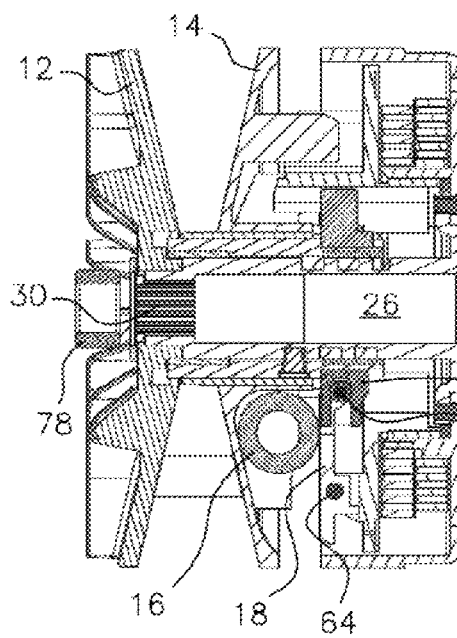
Figure 6D:
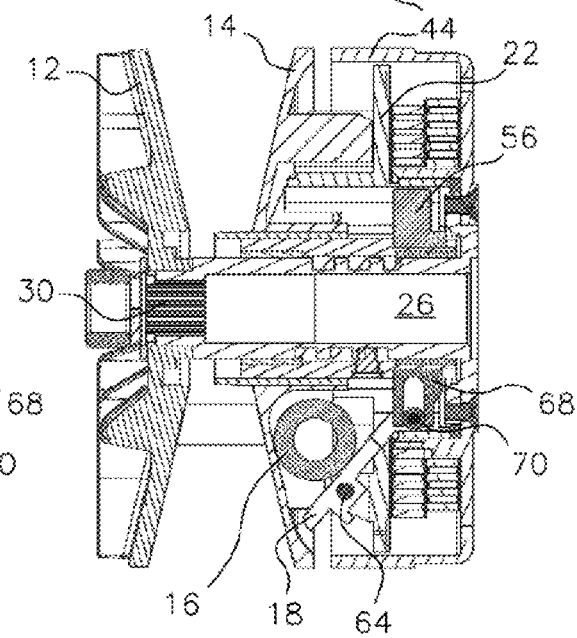

Furthermore, FIGS. 6A and 6C correspond to a moderate load on the driving shaft (for example during cruising at moderate speed), while FIGS. 6B and 6D correspond to a high load (acceleration, climbing, etc.).

It will be noted that, at moderate rotational speed, the flyweights 16 are closer to the driving shaft (or bushing 26) than they are at high rotational speed (motor speed).

The load for its part influences the inclination of the catches 18. In FIGS. 6A and 6B the catch 18 extends radially, this corresponding to a low load, while in the other two figures the catch is inclined toward the inner shroud 14. For low motor speeds, it has been found that the inner shroud 14 is further away from the outer shroud 12 at high load than at moderate load. Since the pulley is a driving pulley, the transmission ratio is therefore lower for the same motor speed at high load.

In this case, the ability to mechanically select an economical management mode or a management mode that promotes performance (optimization of the power) for the continuously variable transmission is proposed.

This management is realized with the aid of the locking finger 72 and the oblong hole 76. The latter is disposed in the peripheral wall 44 of the casing 28 so as to be located facing the locking finger 72 when the motor is at high speed and high (maximum) load. In this situation, the locking finger 72, as a result of centrifugal force, leaves its radial recess 62 and passes at least partially into the oblong hole 76. When the load decreases, the locking finger 72 prevents the plate from rotating in the opposite direction and the catches 18 are kept in the position corresponding to a high load of the motor.

Figure 4A:
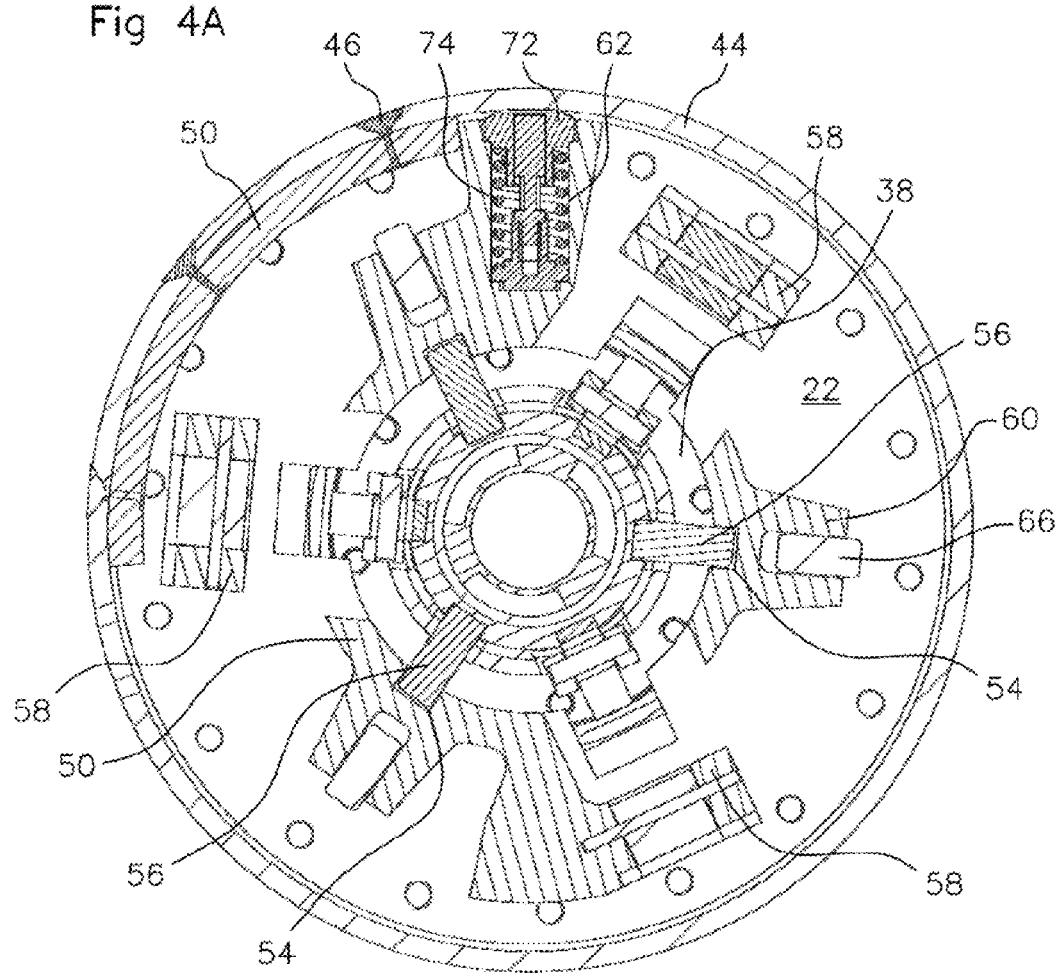
FIG. 4A is a cross-sectional view on the section line IV-IV in FIG. 3.
Figure 4B:
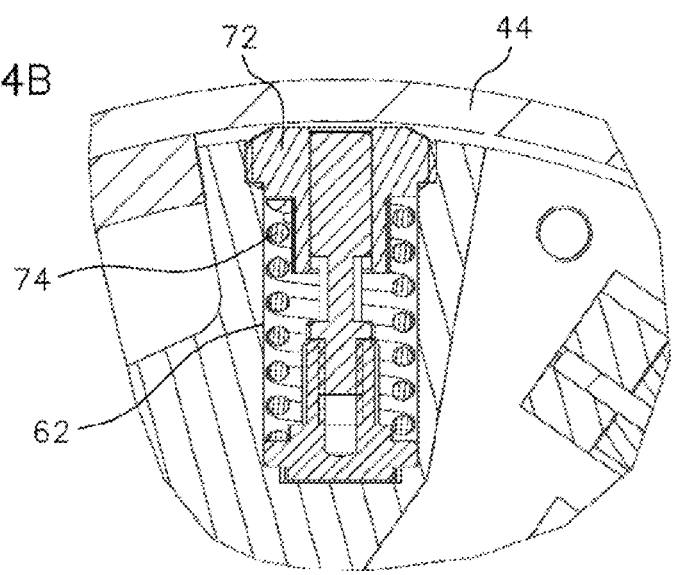
FIG. 4B is a detail view of FIG. 4A.

FIGS. 4A and 4B illustrate the locking finger 72 in the position in which it is withdrawn into its radial recess 62.

The transmission is then in the management mode known as the economical mode.

Figure 5A:
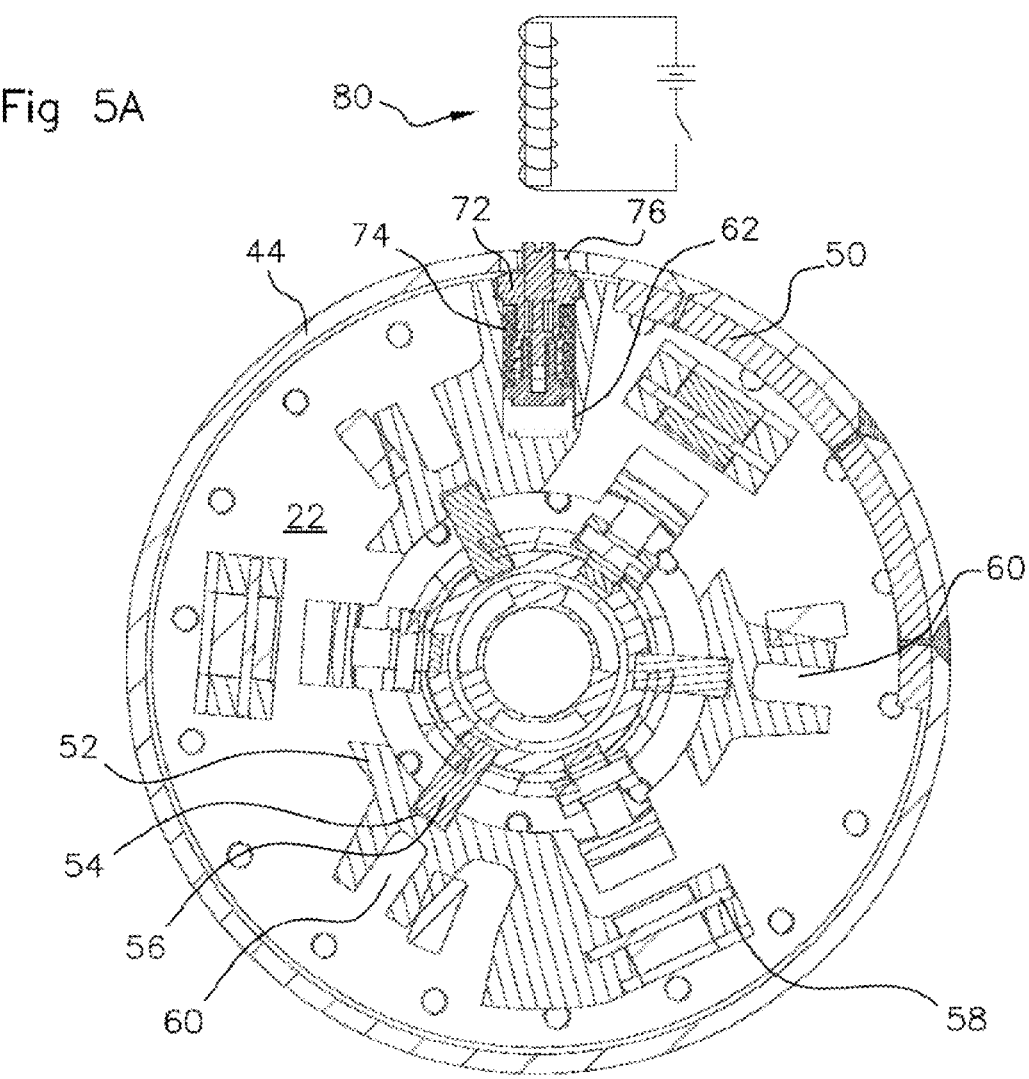
FIG. 5A is a cross-sectional view corresponding to FIG. 4A but in a different position.
Figure 5B:
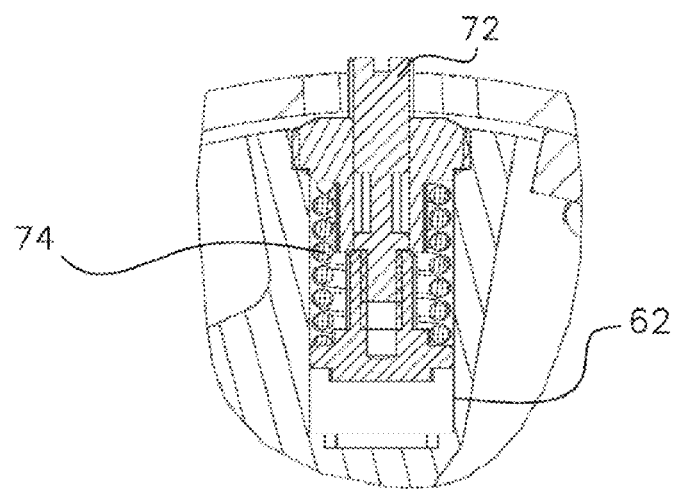
FIG. 5B is a detail view of FIG. 5A, FIGS. 6A to 6D are views in longitudinal section of the pulley in FIGS. 2 to 5 in various modes of operation (load, speed)

FIGS. 5A and 5B show the locking finger 72 in its moved-out, or locking, position. The transmission is then in the management mode known as the high-performance mode.

The change from economical mode to high-performance mode occurs automatically when the speed is high and the load is at (or almost at) a maximum. Under the effect of centrifugal force, the locking finger 72 comes out. The return spring 74 is preloaded to allow the locking finger 72 to come out and to allow locking in high-performance mode starting from a predetermined motor speed.

For the change to economical mode from high-performance mode, there is provided a solenoid 80 with a movable pin positioned facing the oblong hole 76 so as to be able to act on the locking finger 72 in the direction of the return spring 74, i.e. to make it withdraw into its radial recess 62.

If the economical mode is commanded when the motor is at full load and high speed, the solenoid 80 acts on the locking finger 72 in order to push it back into its radial recess 62. When the load decreases, the transmission returns to the position illustrated in FIG. 4.

If the economical mode is commanded while the transmission is locked in high-performance mode, the change to economical mode takes place as soon as the full load at high speed is realized. This is because it is necessary to wait for the locking finger 72 to no longer be trapped in order to withdraw it into its radial recess.

In a variant embodiment, it would be possible to have a locking finger that moves longitudinally. Specifically, two faces that extend generally transversely with respect to the shaft could be locked together. It would thus be possible to have an elastically preloaded finger that is borne by the plate 22 and bears on the end wall 40 of the casing 28. The latter would have a hole in which the end of the finger would be housed.

As will become apparent to those skilled in the art, depending on the environment, the locking finger could be disposed in a particular way depending both on the space that is available at the pulley and on the space around the pulley for positioning the unlocking device.

Figure 7:
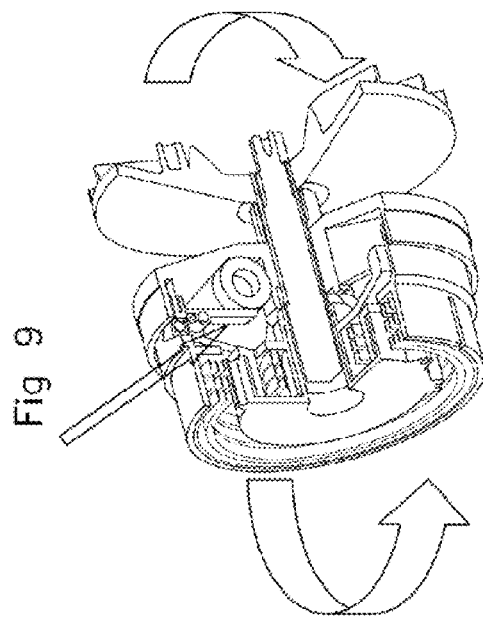
FIG. 7 shows a perspective and cross-sectional view of a pulley that can be used in cooperation with the pulley in FIGS. 2 to 6 to form a continuously variable transmission.
Figure 8:
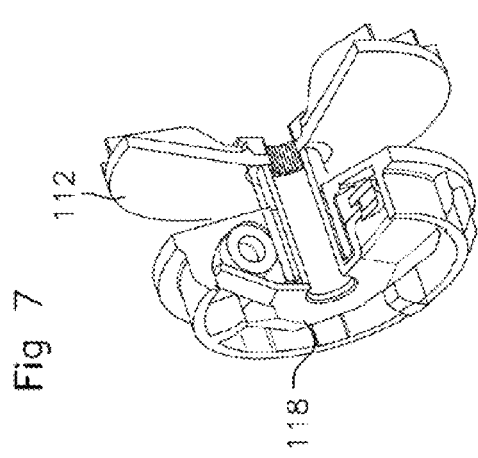
FIG. 8 shows the pulley in FIG. 7 in an exploded perspective view.

FIGS. 7 and 8 illustrate a driven pulley that can be associated with the driving pulley described above so as to form a continuously variable transmission.

It is proposed in this case to have a driven pulley with a fixed outer shroud 112 and a movable inner shroud 114. The two shrouds, the outer shroud 112 and the inner shroud 114, are mounted on a bushing 120 surrounding the driven shaft. Here again, the outer shroud 112 is mounted so as to be secured to the driven shaft.

The inner shroud 114 is mounted so as to be able to move between the fixed outer shroud 112 and a set of catches 118 forming a component with a shape similar to that of an umbrella. These catches 118 have a predetermined inclination with respect to the driven shaft. Between the set of catches 118 and the inner shroud 114, flyweights 116 are guided so as to move radially when the rotational speed of the driven shaft varies. When the speed (of rotation of the driven shaft, or that of the vehicle) increases, the inner shroud 114 moves closer to the outer shroud 112. When this speed decreases, the belt passing around the pulley tends to move the inner shroud 114 away from the outer shroud 112.

Figure 9:
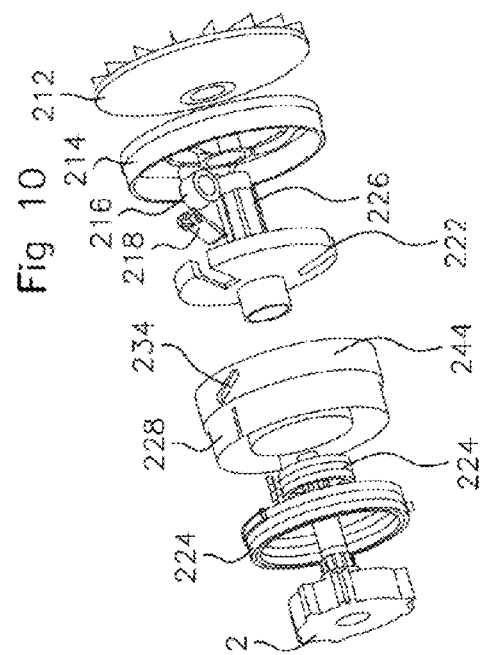
FIG. 9 shows a perspective and cross-sectional view of a pulley according to the invention in a variant embodiment compared with FIGS. 2 to 6.
Figure 10:
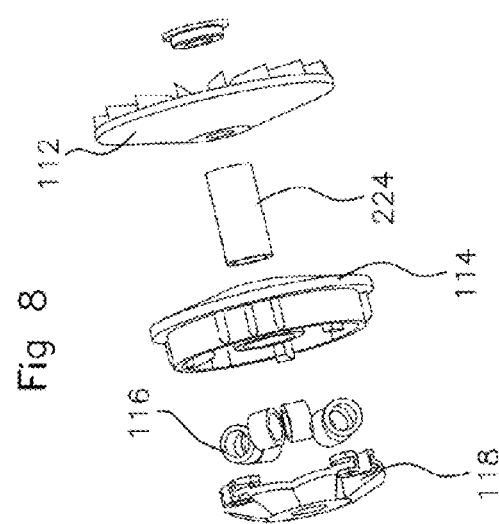
FIG. 10 shows an exploded perspective view of the pulley in FIG. 9.

FIGS. 9 and 10 illustrate a variant embodiment of a driving pulley. This embodiment also allows the transmission ratio to be varied depending on the load and the rotational speed of the motor, but with a slightly different architecture.

The references used to describe this embodiment correspond to the references used in the description of FIGS. 2 to 6 but increased by 200 to denote similar components.

There would appear to be no need to describe the embodiment in FIGS. 9 and 10 in detail. The main differences compared with the embodiment in FIGS. 2 to 6 that was described in detail above will be indicated, as will the mode of operation of this variant embodiment.

The pulley is mounted directly on the drive shaft, or driving shaft 2. Springs 224 are mounted between the driving shaft 2 and a casing 228 that has a peripheral wall 244. Thus, the angular position of the peripheral wall 244 varies with respect to that of the driving shaft.

A plate 222 mounted on a bushing 226 driven by the driving shaft 2 in this case bears catches 218. This plate 222 is secured to the driving shaft 2. The catches 218 are mounted so as to pivot about a tangential axis on the plate 222. Each catch 218 has a lever which is oriented toward the peripheral wall 244 and of which the end engages in a helical groove 234 made in the peripheral wall 244. When the peripheral wall 244 changes angular position with respect to the driving shaft 2, and therefore also with respect to the plate 222, the lever makes the corresponding catch 218 pivot about its tangential axis. A variable inclination of the catches 218 is thus realized depending on the load applied to the drive shaft (driving shaft 2).

Here again, the catches 218 act as a contact surface for flyweights 216 that are also in contact with a conical face of an inner shroud 214 in order to vary the position thereof with respect to an outer shroud 212.

In this embodiment, the locking in high-performance mode can be done by mounting a locking finger radially on the plate 222 so as to make it cooperate with the peripheral wall 244. The operation of the locking finger may be the same as that described above with reference in particular to FIGS. 4 and 5.

In this embodiment, there is therefore also a pulley in which a component having a variable angular position with respect to the shaft of the pulley depending on the torque transmitted at the pulley, and also a locking system that keeps this movable component in a given position. It is preferably a driving pulley of a continuously variable transmission system with a belt.

In the description above, locking in a position corresponding to a high (or maximum) load is envisioned. However, it is conceivable to have locking in another position, with minimum load or for a predetermined intermediate load. It is also possible to envision locking in two separate positions on a single device.

The present invention is not limited to the embodiments described above by way of nonlimiting examples and to the variants mentioned, but also relates to all the variant embodiments within the competence of those skilled in the art.

The invention claimed is:

1. A pulley comprising:
   a shaft;
   a fixed shroud mounted to be unable to move longitudinally with respect to the shaft;
   a movable shroud mounted to be driven in rotation by the shaft but configured to move longitudinally with respect to the shaft;
   a casing including a peripheral wall; and
   a mechanism configured to mechanically control the longitudinal movement of the movable shroud with respect to the shaft, the mechanism comprising
      a first assembly mounted on the shaft and driven in rotation by the shaft,
      a second assembly mounted on the shaft by at least one torsion spring housing in the casing such that the relative angular position of the second assembly with respect to the shaft depends on the torque transmitted by the shaft, and
      a locking system configured to lock in at least one position, the locking system being provided between the first assembly and the second assembly, the locking system comprising a radially extending finger and a hole defined in the peripheral wall of the casing, the radially extending finger being configured to project into the hole.

2. The pulley as claimed in claim 1, wherein the radially extending finger is configured to move between a first position in which the finger is located entirely inside the peripheral wall and a second position in which the finger projects into the hole defined in the peripheral wall.

3. The pulley as claimed in claim 2, further comprising a controlled peg configured to push the finger back into the peripheral wall.

4. The pulley as claimed in claim 1, wherein relative rotational movement of the second assembly with respect to the shaft is within a predetermined angular range, and
   wherein the first assembly and the second assembly are locked together when the second assembly is substantially in a position corresponding to one end of said predetermined angular range.

5. The pulley as claimed in claim 1, further comprising at least two movable catches that are articulated about an axis disposed in a plane transverse to the shaft, the angular position of the at least two movable catches about the axis thereof is given by the angular position of the second assembly with respect to the shaft, and
   wherein a flyweight is respectively guided to be in contact, on one side, with a respective of the movable catches and, on the other side, with the face of the movable shroud that faces away from the fixed shroud.

6. The pulley as claimed in claim 5, wherein the first assembly has
   a first cylindrical part that is mounted on the shaft and has, on an outer face thereof, facing away from the shaft, at least one helical groove,
   an end wall, and
   an outer peripheral wall,
   wherein the second assembly has a plate configured such that the end wall, the outer peripheral wall, and the plate form a housing to accommodate the at least one torsion spring, and
   wherein said pulley has an intermediate assembly with a second cylindrical part that is mounted at least partially around the first cylindrical part and has a peg engaged in the helical groove, said second cylindrical part being mounted to slide in translation parallel to the shaft.

7. The pulley as claimed in claim 6, wherein each of the at least two movable catches has a hinge pin configured to articulate with respect to the plate, each of the movable catches being guided radially in translation with respect to the second cylindrical part.

8. The pulley as claimed in claim 5, wherein the first assembly has
   a first cylindrical part mounted on the shaft, and
   a plate mounted on the cylindrical part, and
   wherein the second assembly has a peripheral wall connected directly or indirectly to the shaft by the at least one torsion spring, said peripheral wall covering the plate of the first assembly.

9. The pulley as claimed in claim 8, wherein each of the at least one movable catch has
   a hinge pin configured to articulate relative to the plate, and
   an arm extending into a helical groove made in the peripheral wall of the second assembly.

10. A belt speed variator comprising:
    two pulleys mounted on parallel shafts,
    wherein one of the pulleys is the pulley as claimed in claim 1.

11. The pulley as claimed in claim 2, wherein relative rotational movement of the second assembly with respect to the shaft is within a predetermined angular range, and
    wherein the first assembly and the second assembly are locked together when the second assembly is substantially in a position corresponding to one end of said predetermined angular range.

12. The pulley as claimed in claim 3, wherein relative rotational movement of the second assembly with respect to the shaft is within a predetermined angular range, and
wherein the first assembly and the second assembly are locked together when the second assembly is substantially in a position corresponding to one end of said predetermined angular range.

13. The pulley as claimed in claim 2, further comprising at least two movable catches that are articulated about an axis disposed in a plane transverse to the shaft, the angular position of the at least two movable catches about the axis thereof is given by the angular position of the second assembly with respect to the shaft, and
wherein a flyweight is respectively guided to be in contact, on one side, with a respective of the movable catches and, on the other side, with the face of the movable shroud that faces away from the fixed shroud.

14. The pulley as claimed in claim 3, further comprising at least two movable catches that are articulated about an axis disposed in a plane transverse to the shaft, the angular position of the at least two movable catches about the axis thereof is given by the angular position of the second assembly with respect to the shaft, and
wherein a flyweight is respectively guided to be in contact, on one side, with a respective of the movable catches and, on the other side, with the face of the movable shroud that faces away from the fixed shroud.

15. The pulley as claimed in claim 4, further comprising at least two movable catches that are articulated about an axis disposed in a plane transverse to the shaft, the angular position of the at least two movable catches about the axis thereof is given by the angular position of the second assembly with respect to the shaft, and
wherein a flyweight is respectively guided to be in contact, on one side, with a respective of the movable catches and, on the other side, with the face of the movable shroud that faces away from the fixed shroud.

16. The pulley as claimed in claim 1, wherein the first assembly has
a first cylindrical part that is mounted on the shaft and has, on an outer face thereof, facing away from the shaft, at least one helical groove,
an end wall, and
an outer peripheral wall,
wherein the second assembly has a plate configured such that the end wall, the outer peripheral wall, and the plate form a housing to accommodate the at least one torsion spring, and
wherein said pulley has an intermediate assembly with a second cylindrical part that is mounted at least partially around the first cylindrical part and has a peg engaged in the helical groove, said second cylindrical part being mounted to slide in translation parallel to the shaft.

17. The pulley as claimed in claim 2, wherein the first assembly has
a first cylindrical part that is mounted on the shaft and has, on an outer face thereof, facing away from the shaft, at least one helical groove,
an end wall, and
an outer peripheral wall,
wherein the second assembly has a plate configured such that the end wall, the outer peripheral wall, and the plate form a housing to accommodate the at least one torsion spring, and
wherein said pulley has an intermediate assembly with a second cylindrical part that is mounted at least partially around the first cylindrical part and has a peg engaged in the helical groove, said second cylindrical part being mounted to slide in translation parallel to the shaft.

18. The pulley as claimed in claim 3, wherein the first assembly has
a first cylindrical part that is mounted on the shaft and has, on an outer face thereof, facing away from the shaft, at least one helical groove,
an end wall, and
an outer peripheral wall,
wherein the second assembly has a plate configured such that the end wall, the outer peripheral wall, and the plate form a housing to accommodate the at least one torsion spring, and
wherein said pulley has an intermediate assembly with a second cylindrical part that is mounted at least partially around the first cylindrical part and has a peg engaged in the helical groove, said second cylindrical part being mounted to slide in translation parallel to the shaft.

19. The pulley as claimed in claim 4, wherein the first assembly has
a first cylindrical part that is mounted on the shaft and has, on an outer face thereof, facing away from the shaft, at least one helical groove,
an end wall, and
an outer peripheral wall,
wherein the second assembly has a plate configured such that the end wall, the outer peripheral wall, and the plate form a housing to accommodate the at least one torsion spring, and
wherein said pulley has an intermediate assembly with a second cylindrical part that is mounted at least partially around the first cylindrical part and has a peg engaged in the helical groove, said second cylindrical part being mounted to slide in translation parallel to the shaft.

* * * * *